(12) United States Patent
Yun et al.

(10) Patent No.: US 9,154,919 B2
(45) Date of Patent: Oct. 6, 2015

(54) LOCALIZATION SYSTEMS AND METHODS

(71) Applicant: Alcatel-Lucent USA Inc., Murray Hill, NJ (US)

(72) Inventors: Doohee Yun, Middletown, NJ (US); Piotr W. Mirowski, New York, NY (US); Hyunseok Chang, Holmdel, NJ (US); T. V. Lakshman, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 176 days.

(21) Appl. No.: 13/867,420

(22) Filed: Apr. 22, 2013

(65) Prior Publication Data

US 2014/0315570 A1    Oct. 23, 2014

(51) Int. Cl.
    *H04W 24/00*    (2009.01)
    *H04W 4/04*     (2009.01)
    *H04W 64/00*    (2009.01)
    *G01S 5/02*     (2010.01)

(52) U.S. Cl.
    CPC .............. *H04W 4/043* (2013.01); *G01S 5/0252* (2013.01); *G01S 5/0263* (2013.01); *H04W 64/00* (2013.01); *H04W 64/003* (2013.01)

(58) Field of Classification Search
    CPC ... H04W 4/043; H04W 64/00; H04W 64/006; G01S 5/0252; G01S 5/0263
    USPC .......... 455/456.1, 456.2, 456.3, 456.4, 456.5, 455/456.6
    See application file for complete search history.

(56) References Cited

U.S. PATENT DOCUMENTS

| | | | |
|---|---|---|---|
| 2011/0209201 A1* | 8/2011 | Chollat | 726/4 |
| 2012/0106738 A1* | 5/2012 | Belenkiy et al. | 380/270 |
| 2012/0135746 A1* | 5/2012 | Mohlig et al. | 455/456.1 |
| 2013/0045751 A1* | 2/2013 | Chao et al. | 455/456.1 |
| 2013/0115971 A1* | 5/2013 | Marti et al. | 455/456.1 |

FOREIGN PATENT DOCUMENTS

| | | |
|---|---|---|
| WO | 2011144967 A1 | 11/2011 |
| WO | 2011144968 A1 | 11/2011 |
| WO | 2012106075 A1 | 8/2012 |

OTHER PUBLICATIONS

International Search Report for PCT/US2014/033951 dated Aug. 14, 2014.

"Sub-meter Accuracy 3D Indoor Positioning Algorithm by Matching Feature Points of 2D Smartphone Photo", published Proceedings of the ION 2013 Pacific PNT Meeting, Apr. 23-25, 2013, Marriott Waikiki Beach Resort & Spa, Honolulu, Hawaii.

* cited by examiner

*Primary Examiner* — Khalid Shaheed
(74) *Attorney, Agent, or Firm* — McCormick, Paulding & Huber LLP

(57) ABSTRACT

A system and method for providing localization of a mobile electronic device within an environment includes at least one server in communication with the mobile electronic device. The at least one server is adapted to receive at least one picture and at least one accelerometer measurement from the mobile electronic device. The at least one server includes a localization module that provides localization to the mobile electronic device based on the at least one picture, the at least one accelerometer measurement and on at least one 3-dimensional map of the environment.

16 Claims, 4 Drawing Sheets

LOCALIZATION SYSTEMS AND METHODS

FIELD OF THE INVENTION

The present invention relates to localization.

BACKGROUND OF THE INVENTION

There is an increasing need to provide indoor localization that replicates the outdoor localization provided by vehicle navigation systems, such as global positioning systems (GPS), in indoor environments where GPS signals are not typically able to register. Approaches for providing indoor localization include Radio Frequency (RF) fingerprinting, where WiFi or cellular signal measurements are matched against RF maps of a site of interest to infer a user's current location at the site, and vision-based Simultaneous Localization and Mapping (SLAM), where a map of an unknown environment is incrementally built by projected images and the viewer's current location and trajectory are deduced along the process. However, these indoor localization systems typically lack accuracy in localization in 3D space or require too resource-intensive computations and/or specialized hardware.

SUMMARY

According to an embodiment, a system for providing localization of a mobile electronic device within an environment includes at least one server in communication with the mobile electronic device. The at least one server is adapted to receive input data from at least one picture and at least one accelerometer measurement from the mobile electronic device. The at least one server includes a localization module that provides localization to the mobile electronic device based on the input data from the at least one picture, the at least one accelerometer measurement and on at least one 3-dimensional map of the indoor environment.

According to an embodiment, the 3-dimensional map includes a database of 3-dimensional feature points.

According to an embodiment, the localization module provides localization by matching 2-dimensional feature points from the at least one picture with the 3-dimensional feature points of the 3-dimensional map.

According to an embodiment, the system includes a cloud computing service for executing the localization module.

According to an embodiment, the at least one accelerometer measurement includes a 3-axis acceleration measurement from a 3-axis accelerometer.

According to an embodiment, the mobile electronic device is a wearable smart gadget.

According to an embodiment, a computerized method includes receiving, at least one server, input data from at least one picture and at least one accelerometer measurement from a mobile electronic device. The at least one server compares the input data from the at least one picture and at least one accelerometer measurement to a 3-dimensional map of an environment and transmits localization to the mobile electronic device indicative of a 3-dimensional position and orientation of the mobile electronic device within the environment.

According to an embodiment, the method additionally comprises constraining, at the at least one server, a search space of the 3-dimensional map to a subset for comparing the at least one picture and at least one accelerometer measurement to the 3-dimensional map.

According to an embodiment, constraining, at the at least one server, the search space of the 3-dimensional map includes calculating a pitch and roll of the mobile electronic device from the accelerometer measurement.

According to an embodiment, constraining, at the at least one server, the search space of the 3-dimensional map additionally includes approximating a position of the mobile electronic device within the environment using at least one of WiFi geolocation, a two-dimensional barcode or location information input in the mobile electronic device.

According to an embodiment, the approximate position of the mobile electronic device may be within twenty meters of an actual location of the mobile electronic device.

According to an embodiment, the method additionally comprises matching, at the at least one server, 2-dimensional feature points from the at least one picture with 3-dimensional feature points of the 3-dimensional map.

According to an embodiment, the method additionally comprises determining, at the at least one server, a translation vector and a rotation matrix between matched feature point pairs assuming rigid-body motion.

According to an embodiment, a non-transitory, tangible computer-readable medium storing instructions adapted to be executed by at least one server to perform a method may comprise the steps of receiving input data from at least one picture and at least one accelerometer measurement from a mobile electronic device, comparing the input data from the at least one picture and at least one accelerometer measurement to a 3-dimensional map of an environment stored in memory and transmitting localization to the mobile electronic device indicative of a 3-dimensional position and orientation of the mobile electronic device within the environment.

According to an embodiment, the method may further comprise constraining a search space of the 3-dimensional map to a subset for comparing the at least one picture and at least one accelerometer measurement to the 3-dimensional map.

According to an embodiment, constraining the search space of the 3-dimensional map includes calculating a pitch and roll of the mobile electronic device from the accelerometer measurement.

According to an embodiment, constraining the search space of the 3-dimensional map additionally includes approximating a position of the mobile electronic device within the environment using WiFi geolocation.

According to an embodiment, the approximate position of the mobile electronic device may be within twenty meters of an actual location of the mobile electronic device.

According to an embodiment, the method may additionally comprise matching 2-dimensional feature points from the at least one picture with 3-dimensional feature points of the 3-dimensional map.

According to an embodiment, the method may additionally comprise determining a translation vector and a rotation matrix between matched feature point pairs assuming rigid-body motion.

These and other embodiments will become apparent in light of the following detailed description herein, with reference to the accompanying drawings.

DETAILED DESCRIPTION

Figure 1:
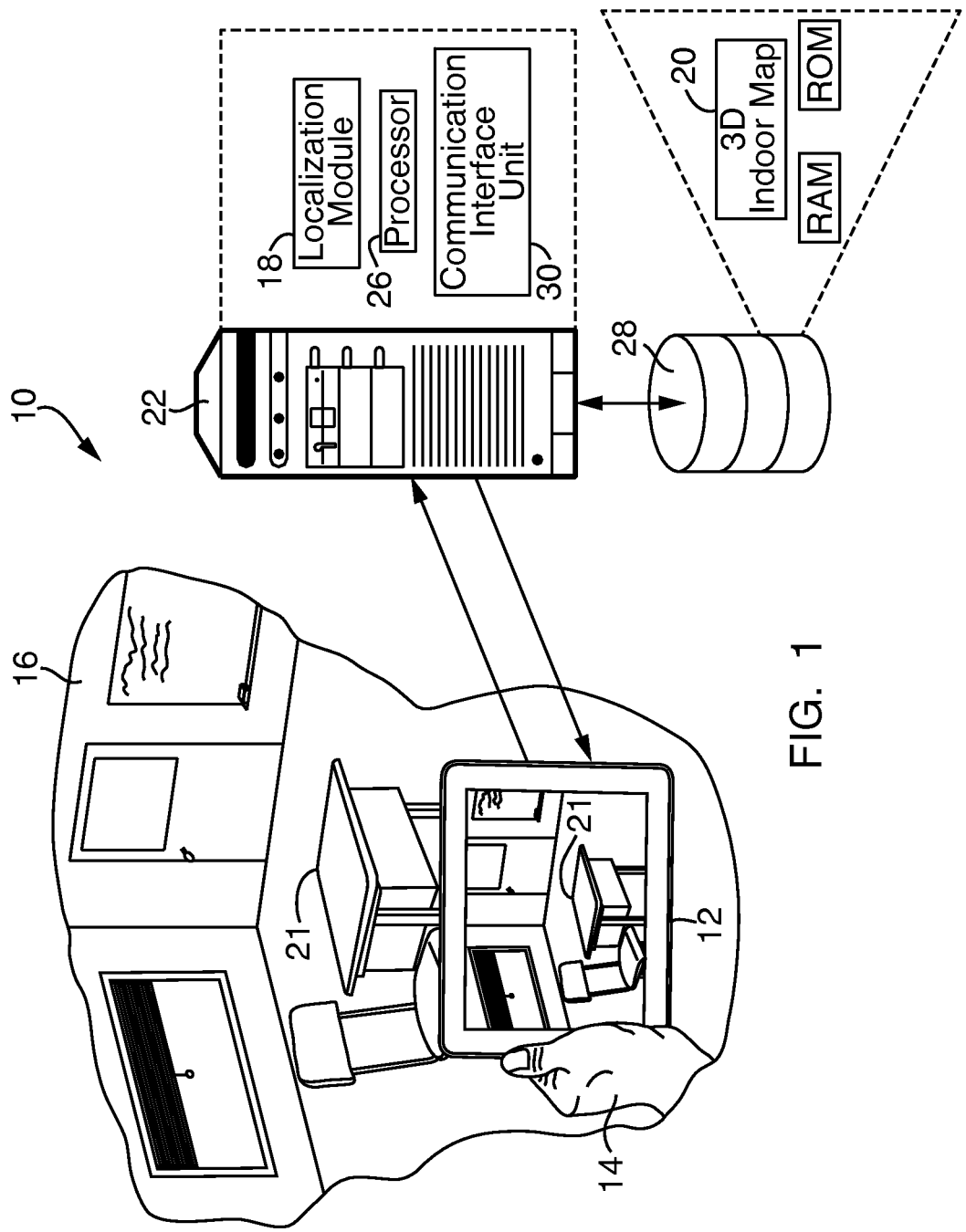
FIG. 1 is a schematic diagram of a system according to an embodiment.

Before the various embodiments are described in further detail, it is to be understood that the invention is not limited to the particular embodiments described. It will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

In the drawings, like reference numerals refer to like features of the systems and methods of the present application. Accordingly, although certain descriptions may refer only to certain Figures and reference numerals, it should be understood that such descriptions might be equally applicable to like reference numerals in other Figures.

Referring to FIG. 1, a system 10 for indoor localization is shown. The system 10 includes a mobile electronic device 12 adapted to be operated by a user 14 within an indoor environment 16, a localization module 18 and a pre-built indoor 3-dimensional (3D) map 20 of the indoor environment 16.

The mobile electronic device 12 may be any typical mobile device that includes a color camera, a 3-axis accelerometer, and at least one communication network connection (e.g. a connection to a mobile data network, a WiFi wireless computer network, or the like). For example, the mobile electronic device 12 may be a cellular telephone, smart phone, a tablet, GOOGLE GLASS, or any similar portable device that may be worn and/or carried and operated by the user 14 inside the indoor environment 16.

The pre-built 3D indoor map 20 of the indoor environment 16 is built offline, before the system 10 can perform indoor localization, to capture geometry of the indoor environment 16 of interest. The pre-built 3D indoor map 20 is stored in a location that is accessible to the localization module 18 as will be discussed in greater detail below. The 3D indoor map 20 may be a collection or database of 3D feature points 21 sampled in the indoor environment 16. The pre-built 3D indoor map 20 may be built, for example, using a color and depth (RGB-D) camera, such as the KINECT motion sensing input device developed by MICROSOFT, to map the indoor environment 16 of a particular building of interest. The KINECT motion sensing input device has an Infra-Red (IR) pattern source and an IR camera. The IR camera detects IR patterns projected by the IR pattern source and reflected on objects, which allows an on-board chip to estimate a depth map of the object using stereoscopy. This depth map and the corresponding RGB image provided by the RGB camera may be used to define 3D feature points 21 in an indoor map coordinate system (x, y, z), shown in FIG. 2. Each 3D feature point 21 may include, for example, 3D coordinates in the 3D indoor map 20 and a Scale Invariant Feature Transform (SIFT) descriptor (e.g. a 128-dimensional vector) that characterizes an appearance of a small area around the 3D feature point 21 to allow for feature point matching. The 3D indoor map 20 may be built by iteratively associating 3D feature points 21 from consecutive RGB-D images as the RGB-D camera is moved around the indoor environment 16 to define the pre-built 3D indoor map 20 of the indoor environment 16 as the collection or database of these 3D feature points 21.

Figure 3:
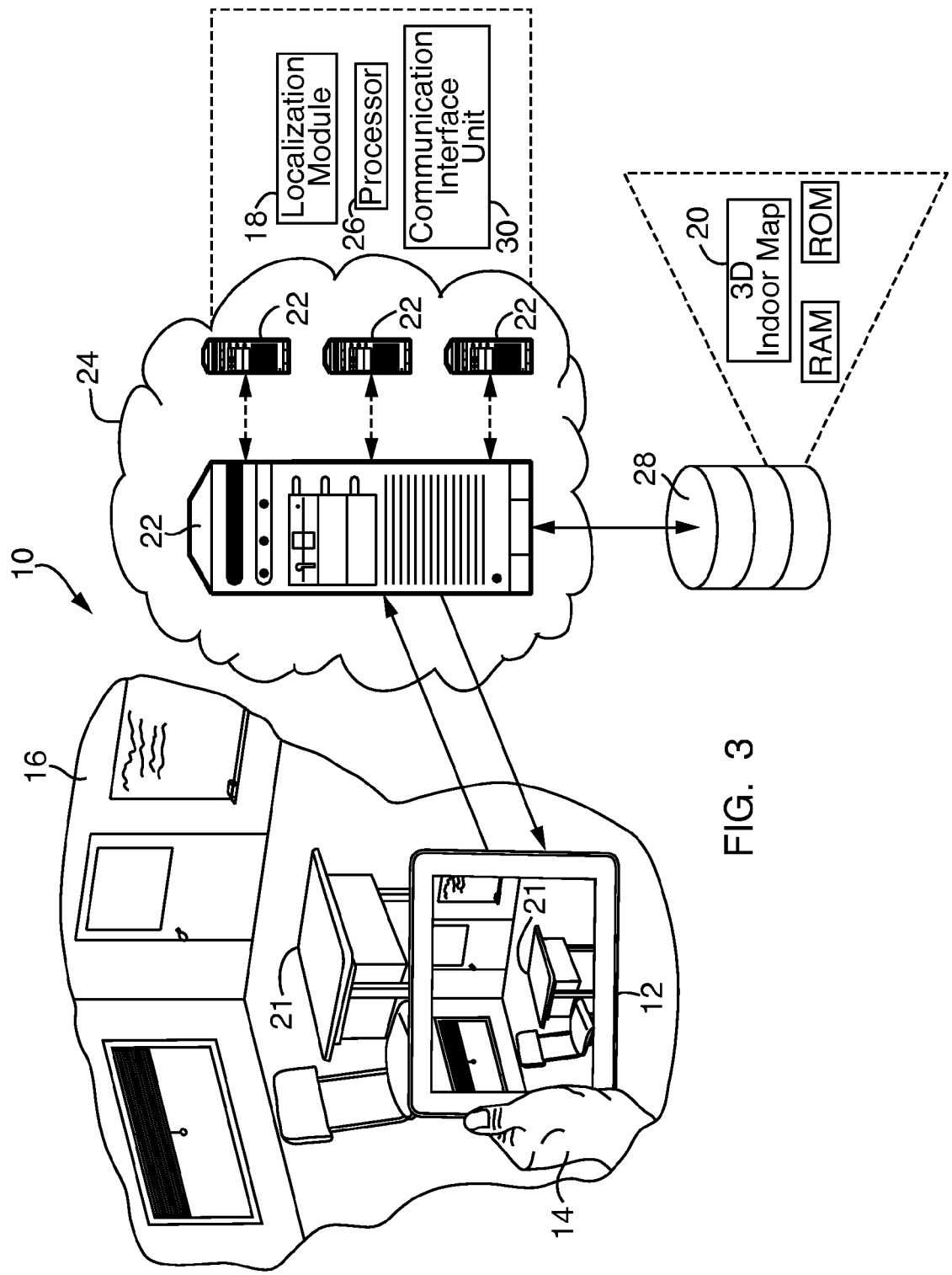
FIG. 3 is a schematic diagram of the system of FIG. 1 implementing a cloud computing service.

The localization module 18 may be located on a server 22 and is adapted to communicate with the mobile electronic device 12 to receive input therefrom and to provide localization to the electronic device 12 in response to the input. The server 22 may be a standalone server unit or may be a cloud computing service 24, as shown in FIG. 3, as should be understood by those skilled in the art. The server 22 includes the necessary electronics, software, memory, storage, databases, firmware, logic/state machines, microprocessors, communication links, and any other input/output interfaces to perform the functions described herein and/or to achieve the results described herein. For example, the server 22 may include processor 26 and memory 28, which may include system memory, including random access memory (RAM) and read-only memory (ROM). The server 22 may be in communication with the mobile electronic device 12 and/or to one or more other mobile devices through a communication interface unit 30, as should be understood by those skilled in the art, to facilitate the operation of the system 10 for indoor localization as discussed below. Suitable computer program code may be provided to the server 22 for executing numerous functions, including those discussed below in connection with the localization module 18.

The processor 26 may include one or more conventional microprocessors and one or more supplementary co-processors such as math co-processors or the like. The processor 26 may be in communication with the communication interface unit 30, through which the processor 26 may communicate with other networks and/or devices such as other servers, other processors, computers, cellular telephones, tablets and the like. The communication interface unit 30 may include multiple communication channels for simultaneous communication with, for example, other mobile electronic devices 12, processors, servers, computers, cellular telephones, tablets, or the like. Devices in communication with each other need not be continually transmitting to each other. Devices in communication with each other may require several steps to be performed to establish a communication link between the devices.

The processor 26 is in communication with the memory 28, which may comprise an appropriate combination of magnetic, optical and/or semiconductor memory, and may include, for example, RAM, ROM, flash drive, an optical disc such as a compact disc and/or a hard disk or drive. The processor 26 and the memory 28 each may be, for example, located entirely within a single computer or other device; or connected to each other by a communication medium, such as a USB port, serial port cable, a coaxial cable, an Ethernet type cable, a telephone line, a radio frequency transceiver or other similar wireless or wired medium or combination of the foregoing. For example, the processor 26 may be connected to memory 28 via the communication interface unit 30.

The memory 28 stores the pre-built 3D indoor map 20 and may also store, for example, one or more databases and/or other information required by the localization module 18, an operating system for the server 22, and/or one or more other programs (e.g., computer program code and/or a computer program product) adapted to direct the localization module 18 to provide localization to the mobile electronic device 12 according to the various embodiments discussed herein. For example, the memory 28 may also store a WiFi fingerprint map (not shown) of the indoor environment 16 as will be discussed in greater detail below. The pre-built 3D indoor map 20, operating system, localization module 18 and/or other programs may be stored, for example, in a compressed, an uncompiled and/or an encrypted format, and may include computer program code executable by the processor 26. The instructions of the computer program code may be read into a main memory of the processor 26 from the memory 28 or a computer-readable medium other than the memory 28. While execution of sequences of instructions in the program causes the processor 26 to perform the process steps described herein, hard-wired circuitry may be used in place of, or in combination with, software instructions for implementation of the processes of the present invention. Thus, embodiments of the present invention are not limited to any specific combination of hardware and software.

The programs discussed herein may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such providing indoor localization of the mobile electronic device 12. In an embodiment, an application of executable code may be a compilation of many instructions, and may even be distributed over several different code partitions or segments, among different programs, and across several devices.

The term "computer-readable medium" as used herein refers to any medium that provides or participates in providing instructions and/or data to the processor 26 of the server 22 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 26 (or any other processor of a device described herein) for execution. For example, the instructions may initially be stored on a magnetic disk of a remote computer (not shown). The remote computer can load the instructions into its dynamic memory and send the instructions over an Ethernet connection, cable line, telephone line using a modem, wirelessly or over another suitable connection. A communications device local to a computing device (e.g., server 22) can receive the data on the respective communications line and place the data on a system bus for the processor 26. The system bus carries the data to the main memory, from which the processor 26 retrieves and executes the instructions received by main memory may optionally be stored in memory 28 either before or after execution by the processor 26. In addition, instructions may be received via a communication port as electrical, electromagnetic or optical signals, which are exemplary forms of wireless communications or data streams that carry various types of information.

In operation, the system 10 for indoor localization allows the localization module 18, executing on the server 22, to calculate the 3D position and orientation of the mobile electronic device 12 using only a 2-dimensional (2D) picture captured by the camera of the mobile electronic device 12 and an acceleration measurement taken by the 3-axis accelerometer of the mobile electronic device 12. Referring back to FIG. 2, the 2D picture captured by the camera and the acceleration measurement from the mobile electronic device 12 are in a device coordinate system (u, v, s). To determine localization for the mobile device 12, the localization module matches 2D feature points 21 in the 2D picture with the 3D feature points 21 in the 3D indoor map 20, shown in FIG. 1, by determining a translation vector $(T_x, T_y, T_z)$ and rotation matrix $(Rx(\gamma), Ry(\beta), Rz(\alpha))$ between matched feature points 21 assuming rigid-body rotation, where $\beta$, $\gamma$, and $\alpha$ are the pitch, roll and yaw of the mobile electronic device 12, respectively.

Figure 4:
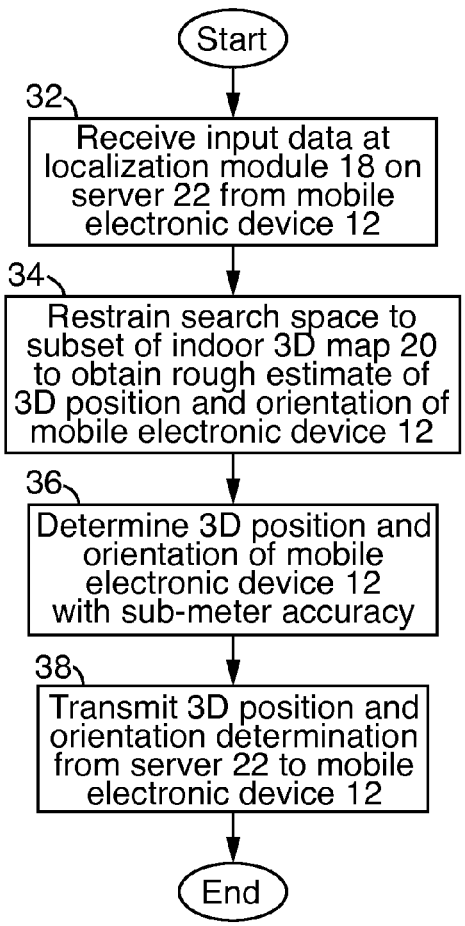
FIG. 4 is a flow diagram of an embodiment for providing indoor localization with the system of FIG. 1.

Referring to FIG. 4, to determine indoor localization of the mobile electronic device 12, the server 22 first receives input data from the 2D picture and acceleration measurement, captured substantially simultaneously, from the mobile electronic device 12 at 32. For example, in an embodiment, a user may take the 2D photo and the acceleration measurements using a cellular telephone, smart phone, tablet, GOOGLE GLASS, or any similar mobile electronic device 12. The acceleration measurements may be, for example, 3-axis acceleration measurements from a 3-axis accelerometer. The user then sends the 2D photograph and acceleration measurements to the localization module 18 on the server 22. Thus, in an embodiment, the input data may be the 2D photograph and acceleration measurements captured by the mobile electronic device 12.

In other embodiments, the mobile electronic device 12 may extract information from the 2D photograph and/or acceleration measurements and may send the extract information instead of, or in addition to, the 2D photograph and/or acceleration measurements. For example, the mobile electronic device 12 may calculate pitch $\beta$ and roll $\gamma$ angles from the accelerometer measurement and may send the calculated angles to the localization system 18 along with the 2D picture as the input data. The mobile electronic device 12 may perform the angle calculation discussed below as should be understood by those skilled in the art.

The mobile electronic device 12 may also extract feature points 21 from the 2D picture and may send the feature points 21 to the localization system 18, instead of sending the 2D picture itself. Extracting the feature points 21 locally at the mobile electronic device 12 may be more power and/or bandwidth-efficient and may conserve computing resources at the localization module 18 and server 22, depending upon an efficiency of the feature point 21 extraction, a quality of the network condition between the mobile electronic device 12 and the server 22 and the like.

Figure 2:
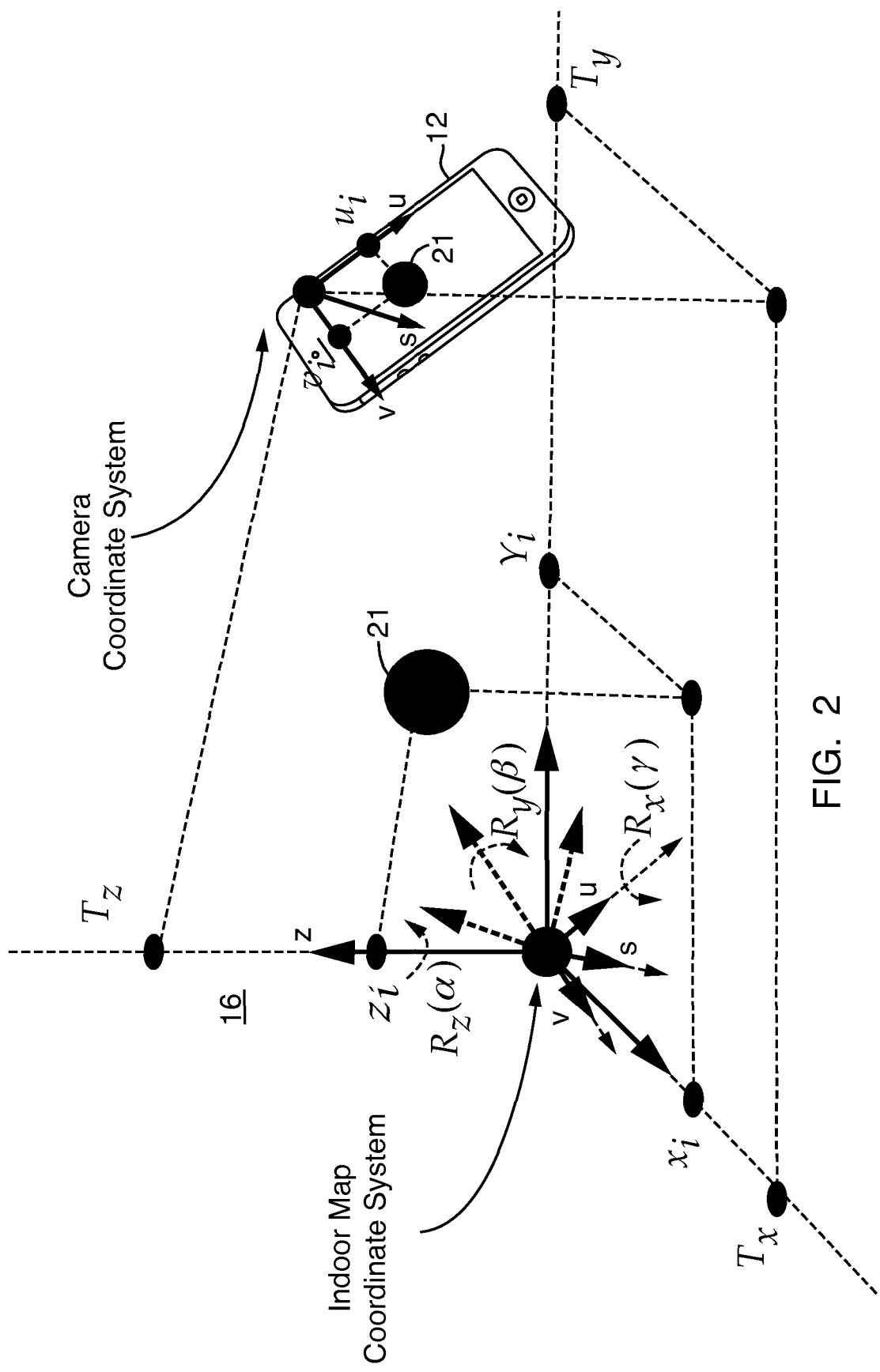
FIG. 2 is schematic diagram of the coordinate systems of the system of FIG. 1.

At 34, the server 22 restrains a search space of the 3D indoor map 20 from the entire map to a subset of the 3D indoor map 20 based on the acceleration measurement received from the mobile electronic device 12. The localization module 18 may restrain the search space using the pitch $\beta$ and roll $\gamma$ angles received from the mobile electronic device 12, if the angles are received as part of the input data, or by first calculating the pitch angle $\beta$ and roll angle $\gamma$ of the mobile electronic device 12 based on the 3-axis accelerometer measurements. The localization module 18 (or the mobile electronic device 12) calculates the pitch $\beta$ and roll $\gamma$ angles by assuming that the acceleration on the mobile electronic device 12 when the measurement was taken is acceleration due to gravity (i.e. noise and/or misalignment biases are ignored). For example, the pitch angle (β) and roll angle (γ) may be calculated from the 3-axis accelerometer measurement of the mobile electronic device 12 according to the equations:

$$\beta = \begin{cases} a\tan2\left(-G_u, \sqrt{G_v^2 + G_s^2}\right), & \text{if } -\frac{\pi}{2} \leq \beta < \frac{\pi}{2} \\ a\tan2\left(-G_u, -\sqrt{G_v^2 + G_s^2}\right) & \text{otherwise} \end{cases}$$

$$\gamma = a\tan2(G_v, -G_s)$$

where $G_u$, $G_v$ and $G_s$ are the components of gravity detected by the 3-axis accelerometer in the device coordinate system (u, v, s), shown in FIG. 2.

The localization module 18 may then constrain the search space of the 3D indoor map 20 using the calculated pitch β and roll γ angles. For example, the localization module 18 may constrain the search space to include only orientations within thirty (30) degrees of the horizontal if the acceleration measurement indicates that the mobile electronic device 12 is tilted upright. The localization module 18 may use the calculated pitch β and roll γ angles to match feature points from the 2D picture provided by the mobile electronic device 12 with feature points from the 3D indoor map 20 stored in memory 28 to obtain a rough estimation of the 3D position, as expressed by the translation vector ($T_x$, $T_y$, $T_z$), and yaw angle α of the mobile electronic device 12 within the subset of the 3D indoor map 20. For example, the localization module 18 may obtain the rough estimation of the 3D position, as expressed by the translation vector ($T_x$, $T_y$, $T_z$), and yaw angle α of the mobile electronic device 12 using a quadratic constraint least-square estimation or similar calculation. The localization module 18 may also apply the Random Sample Consensus (RANSAC) algorithm or the like to remove outliers due to mismatched feature point pairs. For example, in an embodiment, the localization module 18 may compute the translation vector ($T_x$, $T_y$, $T_z$), and yaw angle α by minimizing J, which is the sum of squared transform errors, according to the equation:

$$J = \sum_{l=1}^{O} \left\| s_l \cdot \begin{Bmatrix} u_l \\ v_l \\ 1 \end{Bmatrix} - A \cdot R \cdot \left[ \begin{Bmatrix} x_l \\ y_l \\ z_l \end{Bmatrix} - \begin{Bmatrix} T_x \\ T_y \\ T_z \end{Bmatrix} \right] \right\|^2$$

where,

O is a number of matched feature pairs 21;

$R = R_x(\gamma) \cdot R_y(\beta) \cdot R_z(\alpha)$;

$u_l, v_l$ are the 2D coordinates of an l-th feature point 21 in the device coordinate system (u, v, s), shown in FIG. 2;

$x_l, y_l, z_l$ are the 3D coordinates of the l-th feature point 21 in the map coordinate system (x, y, z), shown in FIG. 2;

A is a 3×3 camera intrinsic matrix;

$$s_l = \frac{1}{W_l}(z_l - t_z);$$

$$\begin{Bmatrix} t_x \\ t_y \\ t_z \end{Bmatrix} = R_z^{-1}(\alpha) \cdot \begin{Bmatrix} T_x \\ T_y \\ T_z \end{Bmatrix};$$

and $$\begin{Bmatrix} U_l \\ V_l \\ W_l \end{Bmatrix} = R_y^{-1}(\beta) \cdot R_x^{-1}(\gamma) \cdot A^{-1} \cdot \begin{Bmatrix} u_l \\ v_l \\ 1 \end{Bmatrix}.$$

For a given yaw angle α, minimizing J may be a least-squares estimation problem with J being a scalar function of the yaw angle α. To ensure the calculated J as a function of α (i.e. J(α)) is a global minimum, J(α) may be calculated by the location module 18 at every 10° degrees of α between 0° and 360° (i.e. the calculation may be repeated 36 times). The location module 18 then selects the α that provides the smallest value for J(α) as the rough estimate of the yaw angle α, which provides a corresponding rough estimate of the 3D position, as expressed by the translation vector ($T_x$, $T_y$, $T_z$).

At 36, the localization module 18 on the server 22 uses the rough estimation of the 3D position and yaw angle α to determine the 3D position and orientation of the mobile electronic device 12 with sub-meter accuracy (i.e. the position and orientation of the mobile electronic device 12 within a meter of the actual position of the device). This full optimization reduces any errors caused by accelerometer measurement errors, for example, due to measurement noise, bias from small accelerations, mechanical misalignments of the camera or accelerometer or the like. To determine the 3D position and orientation of the mobile electronic device 12, the localization module 18 uses matched feature point pairs between the 3D indoor map 20 stored in memory 28 and the 2D picture using the rough estimation of the 3D position and yaw angle α and the calculated pitch β and roll γ angles as a starting point. The localization module 18 conducts a six-parameter optimization (i.e. the 3D position parameters and the three orientation parameters) to calculate the 3D position and attitude angles of the mobile electronic device 12 by determining the translation vector ($T_x$, $T_y$, $T_z$) and rotation matrix (Rx(γ), Ry(β), Rz(α)) between the matched feature point pairs assuming rigid-body motion. The full optimization may be executed using known numerical optimization tools such as MATLAB, GNU OCTAVE or the like. The full optimization allows the localization module 18 to determine the 3D position and orientation of the mobile electronic device 12 with sub-meter accuracy.

In an embodiment, using the rough estimate of the yaw angle α, the localization module 18 may perform an iteration of the Newton-Raphson method to determine the yaw angle α with sub-meter accuracy. In the iteration, the yaw angle α may be updated according the equation:

$$\alpha_{n+1} = \alpha_n - \frac{B(\alpha_n)^T P \frac{\partial B}{\partial \alpha}\big|_{\alpha_n}}{\frac{\partial B}{\partial \alpha}\big|_{\alpha_n}^T P \frac{\partial B}{\partial \alpha}\big|_{\alpha_n} + B(\alpha_n)^T P \frac{\partial^2 B}{\partial \alpha^2}\big|_{\alpha_n}}$$

where, $P = \{1 - H(H^T H)^{-1} H^T\}$;

-continued $$H = \begin{bmatrix} h_1 \\ h_2 \\ \vdots \\ h_O \end{bmatrix}_{20 \times 3};$$

$$h_l = \begin{bmatrix} -1 & 0 & \frac{U_l}{W_l} \\ 0 & -1 & \frac{V_l}{W_l} \end{bmatrix};$$

$$B(\alpha) = \begin{Bmatrix} b_1 \\ b_2 \\ \vdots \\ b_O \end{Bmatrix}_{20 \times 1};$$

and $$b_l(\alpha) = \begin{Bmatrix} \frac{U_l}{W_l} z_l - x_l \cos\alpha + y_l \sin\alpha \\ \frac{V_l}{W_l} z_l - x_l \sin\alpha - y_l \cos\alpha \end{Bmatrix}.$$

Once the yaw angle α is determined, the translation vector ($T_x$, $T_y$, $T_z$), shown in FIG. 2, may be calculated by the location module 18 according to the equation:

$$\begin{Bmatrix} T_x \\ T_y \\ T_z \end{Bmatrix} = R_Z(\alpha)(H^T H)^{-1} H^T B(\alpha).$$

At 38, the server 22 then transmits the calculated 3D position and orientation determination back to the mobile electronic device 12 to provide indoor localization to the mobile electronic device 12 with sub-meter accuracy. The mobile electronic device 12 may use the indoor localization provided by the localization module 18 for a variety of applications. For example, the indoor localization may be used for augmented reality applications, to enhance interactive indoor tours, for destination guidance within indoor environments (e.g. at malls, airports or the like), for mobility aid for blind people, for wireless emergency responses, or for other similar applications.

Figure 5:
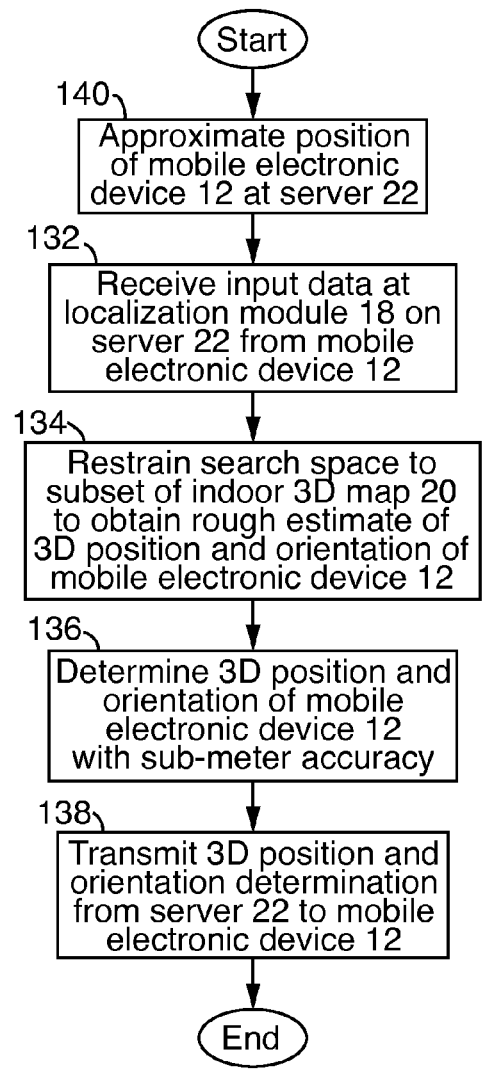
FIG. 5 is a flow diagram of an embodiment for providing indoor localization with the system of FIG. 1.

Referring to FIG. 5, in an embodiment, the system 10, shown in FIG. 1, may also use additional input from the mobile electronic device 12 for approximating the rough estimate of the localization of the mobile electronic device 12. For example, at 140, the server 22 may approximate the position of the mobile electronic device 12 within the indoor structure 16, shown in FIG. 1, using WiFi geolocation, an explicit input from the mobile electronic device 12 (e.g. the reading of two-dimensional barcode such as a QUICK RESPONSE (QR) code, the input of a room number or other similar location information) or the like. To perform WiFi geolocation at 140, the server 22 may compare a WiFi signal received on the mobile electronic device 12 to a WiFi fingerprint map of the indoor structure 16, shown in FIG. 1, which may be stored on the server 22. The WiFi geolocation provides for an approximate position of the mobile electronic device 12 in the indoor structure 16, shown in FIG. 1, within a radius on the magnitude of tens of meters. Various techniques for performing WiFi geolocation should be readily understood by those skilled in the art. Additionally, it should be understood by those skilled in the art that the WiFi fingerprint map of the indoor structure 16, shown in FIG. 1, may be, for example, a pre-existing map of the indoor structure 16, shown in FIG. 1, if one is available. Alternatively, the WiFi fingerprint map may be pre-built in an offline phase (e.g. at the same time that the 3D indoor map 20 is built) according to known techniques for WiFi fingerprint mapping. The approximate position detected through WiFi geolocation is used by the localization module 18 to additionally constrain the search space of the 3D indoor map 20, as will be discussed below. As discussed above, the server 22 may also use an explicit input from the mobile electronic device 12 to approximate localization of the mobile electronic device 12 at 140. For example, the user 14, shown in FIG. 1, may read a two-dimensional barcode, such as a QR code, with the mobile electronic device 12 or may input other localization information directly into the mobile electronic device 12 such as a room number, floor number or the like.

At 132, the server 22 receives input data from the 2D picture and acceleration measurement, which may be captured substantially simultaneously, from the mobile electronic device 12 in substantially the same manner discussed in connection with FIG. 4. For example, in an embodiment, a user may take the 2D photo and the acceleration measurements using a cellular telephone, smart phone, tablet, GOOGLE GLASS, or any similar mobile electronic device 12. The acceleration measurements may be, for example, 3-axis acceleration measurements from a 3-axis accelerometer. The mobile electronic device 12 then sends the 2D photograph and acceleration measurements to the localization module 18 on the server 22. Thus, in an embodiment, the input data may be the 2D photograph and acceleration measurements captured by the mobile electronic device 12.

As discussed above, in other embodiments, the mobile electronic device 12 may extract information from the 2D photograph and/or acceleration measurements and may send the extract information instead of, or in addition to, the 2D photograph and/or acceleration measurements. For example, the mobile electronic device 12 may calculate pitch β and roll γ angles from the accelerometer measurement and may send the calculated angles to the localization system 18 along with the 2D picture as the input data. The mobile electronic device 12 may perform the angle calculation discussed below as should be understood by those skilled in the art.

The mobile electronic device 12 may also extract feature points 21 from the 2D picture and may send the feature points 21 to the localization system 18, instead of sending the 2D picture itself. Extracting the feature points 21 locally at the mobile electronic device 12 may be more power and/or bandwidth-efficient and may conserve computing resources at the localization module 18 and server 22, depending upon an efficiency of the feature point 21 extraction, a quality of the network condition between the mobile electronic device 12 and the server 22 and the like.

At 134, the server 22 restrains a search space of the 3D indoor map 20 from the entire map to a subset of the 3D indoor map 20 based on the approximate position detected at 140 (e.g. through WiFi geolocation) and on the acceleration measurements received from the mobile electronic device 12. The localization module 18 uses the approximate position detected at 140 (e.g. through WiFi geolocation) to restrain the search space from the entire 3D indoor map 20 of the indoor space to the smaller subset (e.g. in a radius of twenty (20) meters around the approximate position detected through WiFi geolocation). To further restrain the search space, the localization module 18 may use the pitch β and roll γ angles received from the mobile electronic device 12, if the angles are received as part of the input data, or may calculate the pitch and roll angles of the mobile electronic device 12 from the 3-axis accelerometer measurements, in substantially the same manner discussed in connection with FIG. 4, by assuming that the only acceleration on the mobile electronic device 12 when the measurement was taken is acceleration due to gravity (i.e. noise and/or misalignment biases are ignored). The localization module 18 may then constrain the search space of the 3D indoor map 20 using the calculated pitch and roll angles. For example, the localization module 18 may constrain the search space to include only orientations within thirty (30) degrees of the horizontal if the acceleration measurement indicates that the mobile electronic device 12 is tilted upright. The localization module 18 then uses the calculated pitch and roll angles to match feature points from the 2D picture provided by the mobile electronic device 12 with feature points from the constrained subset of the 3D indoor map 20 stored in memory 28 to obtain a rough estimation of the 3D position and yaw angle of the mobile electronic device 12 within the subset of the 3D indoor map 20. For example, the localization module 18 may obtain the rough estimation of the 3D position and yaw angle of the mobile electronic device 12 using a quadratic constraint least-square estimation or similar calculation. The localization module 18 may also apply the Random Sample Consensus (RANSAC) algorithm or the like to remove outliers due to mismatched feature point pairs.

At 136, the localization module 18 on the server 22 uses the rough estimation of the 3D position and yaw angle to determine the 3D position and orientation of the mobile electronic device 12 with sub-meter accuracy (i.e. the position and orientation of the mobile electronic device 12 within a meter of the actual position of the device) in substantially the same manner discussed in connection with FIG. 4. This full optimization reduces any errors caused by accelerometer measurement errors, for example, due to measurement noise, bias from small accelerations, mechanical misalignments of the camera or accelerometer or the like. To determine the 3D position and orientation of the mobile electronic device 12, the localization module 18 uses matched feature point pairs between the 3D indoor map 20 stored in memory 28 and the 2D picture using the rough estimation of the 3D position and yaw angle and the calculated pitch and roll angles as a starting point. The localization module 18 conducts a six-parameter optimization (i.e. the 3D position parameters and the three orientation parameters) to calculate the 3D position and attitude angles of the mobile electronic device 12 by determining a translation vector and rotation matrix between the matched feature point pairs assuming rigid-body motion. The full optimization may be executed using known numerical optimization tools such as MATLAB, GNU OCTAVE or the like. The full optimization allows the localization module 18 to determine the 3D position and orientation of the mobile electronic device 12 with sub-meter accuracy.

At 138, the server 22 then transmits the calculated 3D position and orientation determination back to the mobile electronic device 12 to provide indoor localization to the mobile electronic device 12 with sub-meter accuracy (i.e. centimeter-level 3D localization). The mobile electronic device 12 may use the indoor localization provided by the localization module 18 for a variety of applications. For example, the indoor localization may be used for augmented reality applications, to enhance interactive indoor tours, for destination guidance within indoor environments (e.g. at malls, airports or the like), for mobility aid for blind people, for wireless emergency responses, or for other similar applications.

The system 10 shown in FIG. 1 advantageously allows calculation of the 3D position and orientation of the mobile electronic device 12 using input data from a 2D photograph and accelerometer measurements captured from the electronic device 12 with an existing 3D indoor map 20 of the indoor structure 16, shown in FIG. 1. In another embodiment, WiFi measurements or location information from the mobile electronic device 12 and, in an embodiment, an existing WiFi fingerprint map stored on one or several remote servers 22 are also used in addition to the 2D photograph and the accelerometer measurements to determine the location of the mobile electronic device 12. Advantageously, aside from the 3D indoor map 20 (and, in an embodiment, the WiFi fingerprint map) of the indoor environment 16, shown in FIG. 1, there is no need for special hardware, such as depth cameras, on mobile devices, or for installations of dedicated equipments such as radio frequency beacons.

The system 10, shown in FIG. 1, advantageously provides for accurate indoor localization (i.e. position and attitude angles) of mobile electronic devices 12 within sub-meter (e.g. centimeter-level) accuracy.

The system 10 shown in FIG. 1 may be implemented for both commercial and non-commercial Location-Based Services (LBS), including network optimization, precise indoor navigation, augmented reality uses such as advertising (user engagement) or leisure applications (e.g. gaming or museum visits) or any similar application for improving the user's experience within the indoor environment 16, shown in FIG. 1. Additionally, the system 10 provides high-fidelity 3D localization (rather than simple 2D navigation), which may be advantageous for augmented reality based applications using wearable smart gadgets such as GOOGLE GLASS or the like.

The computational overhead for feature point matching may become high in a real-world indoor environment depending upon the size of the indoor environment (e.g. since the computational overhead for indoor environment 16 shown in FIG. 1 may have a linear relationship with the size of the 3D indoor map 20). The cloud computing service 24, as shown in FIG. 3, ma advantageously address this issue by offloading computation in a scale-out fashion to a plurality of servers 22 in the cloud to allow the cloud computing service 24, shown in FIG. 3, to compute the 3D position and orientation angles of the mobile electronic device 12. The cloud computing service 24, shown in FIG. 3, may advantageously allow the system 10, shown in FIG. 1, to produce localization results with ten (10) centimeter accuracy in a matter of seconds.

Although this invention has been shown and described with respect to the detailed embodiments thereof, it will be understood by those skilled in the art that various changes in form and detail thereof may be made without departing from the spirit and the scope of the invention. For example, although the system 10, shown in FIG. 1, is described in connection with providing localization in indoor environments, the system 10 may provide localization in a variety of environments, including outdoor environments.

What is claimed is:

1. A system for providing localization of a mobile electronic device within an environment, the system comprising:
at least one server in communication with the mobile electronic device, the at least one server adapted to receive input data from at least one picture and at least one accelerometer measurement from the mobile electronic device;

a memory database in communication with at least one server, the memory database storing at least one 3-dimensional map of the environment; and a localization module adapted to be executed by the at least one server, the localization module providing localization to the mobile electronic device based on the input data from the at least one picture, the at least one accelerometer measurement and the at least one 3-dimensional map of the environment;

wherein the 3-dimensional map includes a database of 3-dimensional feature points; and wherein the localization module provides localization by matching 2-dimensional feature points from the at least one picture with the 3-dimensional feature points of the 3-dimensional map.

2. The system according to claim 1, wherein the system includes a cloud computing service for executing the localization module.

3. The system according to claim 1, wherein the at least one accelerometer measurement includes a 3-axis acceleration measurement from a 3-axis accelerometer.

4. The system according to claim 1, wherein the mobile electronic device is a wearable smart gadget.

5. A computerized method comprising the steps of:
receiving, at at least one server, input data from at least one picture and at least one accelerometer measurement from a mobile electronic device;
comparing, at the at least one server, the input data from the at least one picture and at least one accelerometer measurement to a 3-dimensional map of an environment stored in memory;
constraining, at the at least one server, a search space of the 3-dimensional map to a subset for comparing the at least one picture and at least one accelerometer measurement to the 3-dimensional map; and
transmitting, from the at least one server, localization to the mobile electronic device indicative of a 3-dimensional position and orientation of the mobile electronic device within the environment.

6. The method according to claim 5, wherein constraining, at the at least one server, the search space of the 3-dimensional map includes calculating a pitch and roll of the mobile electronic device from the accelerometer measurement.

7. The method according to claim 6, wherein constraining, at the at least one server, the search space of the 3-dimensional map additionally includes approximating a position of the mobile electronic device within the environment using at least one of WiFi geolocation, a two-dimensional barcode or location information input in the mobile electronic device.

8. The method according to claim 7, wherein the approximate position of the mobile electronic device is within twenty meters of an actual location of the mobile electronic device.

9. A computerized method comprising the steps of:
receiving, at at least one server, input data from at least one picture and at least one accelerometer measurement from a mobile electronic device;
comparing, at the at least one server, the input data from the at least one picture and at least one accelerometer measurement to a 3-dimensional map of an environment stored in memory;
matching, at the at least one server, 2-dimensional feature points from the at least one picture with 3-dimensional feature points of the 3-dimensional map; and
transmitting, from the at least one server, localization to the mobile electronic device indicative of a 3-dimensional position and orientation of the mobile electronic device within the environment.

10. The method according to claim 9, additionally comprising:
determining, at the at least one server, a translation vector and a rotation matrix between matched feature point pairs assuming rigid-body motion.

11. A non-transitory, tangible computer-readable medium storing instructions adapted to be executed by at least one server to perform a method comprising the steps of:
receiving, at the at least one server, input data from at least one picture and at least one accelerometer measurement from a mobile electronic device;
comparing, at the at least one server, the input data from the at least one picture and at least one accelerometer measurement to a 3-dimensional map of an environment stored in memory;
constraining, at the at least one server, a search space of the 3-dimensional map to a subset for comparing the at least one picture and at least one accelerometer measurement to the 3-dimensional map; and
transmitting, from the at least one server, localization to the mobile electronic device indicative of a 3-dimensional position and orientation of the mobile electronic device within the environment.

12. The non-transitory, tangible computer-readable medium of claim 11, wherein constraining the search space of the 3-dimensional map includes calculating a pitch and roll of the mobile electronic device from the accelerometer measurement.

13. The non-transitory, tangible computer-readable medium of claim 12, wherein constraining the search space of the 3-dimensional map additionally includes approximating a position of the mobile electronic device within the environment using at least one of WiFi geolocation, a two-dimensional barcode or location information input in the mobile electronic device.

14. The non-transitory, tangible computer-readable medium of claim 13, wherein the approximate position of the mobile electronic device is within twenty meters of an actual location of the mobile electronic device.

15. A non-transitory, tangible computer-readable medium storing instructions adapted to be executed by at least one server to perform a method comprising the steps of:
receiving, at the at least one server, input data from at least one picture and at least one accelerometer measurement from a mobile electronic device;
comparing, at the at least one server, the input data from the at least one picture and at least one accelerometer measurement to a 3-dimensional map of an environment stored in memory;
matching, at the at least one server, 2-dimensional feature points from the at least one picture with 3-dimensional feature points of the 3-dimensional map; and
transmitting, from the at least one server, localization to the mobile electronic device indicative of a 3-dimensional position and orientation of the mobile electronic device within the environment.

16. The non-transitory, tangible computer-readable medium of claim 15, additionally storing instructions adapted to be executed by the at least one server to perform the step of:
determining, at the at least one server, a translation vector and a rotation matrix between matched feature point pairs assuming rigid-body motion.

* * * * *